(No Model.)
W. B. TURNER.
JOURNAL BOX.
No. 385,288. Patented June 26, 1888.
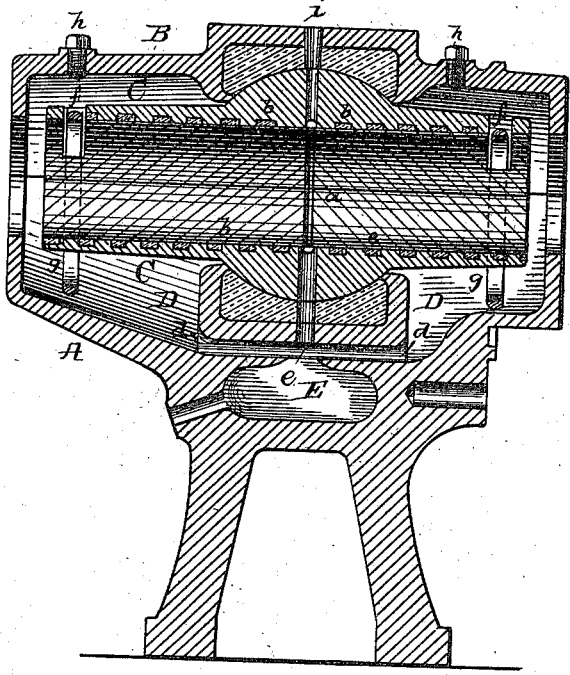
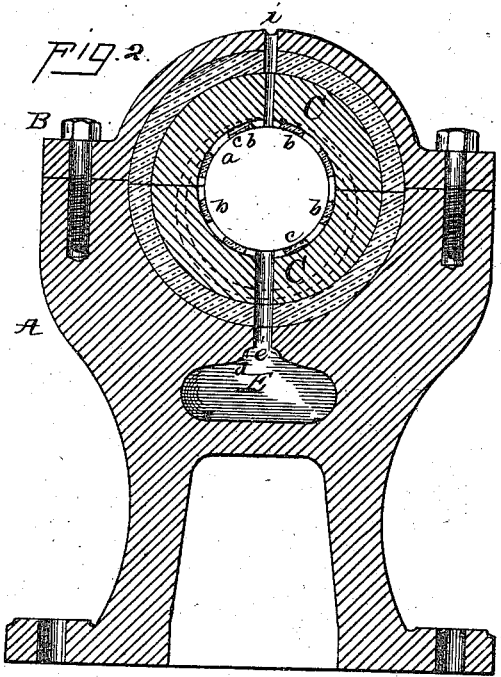
WITNESSES:
INVENTOR
William B. Turner
BY
ATTORNEYS

UNITED STATES PATENT OFFICE.

WILLIAM B. TURNER, OF SCHENECTADY, NEW YORK.

JOURNAL-BOX.

SPECIFICATION forming part of Letters Patent No. 385,288, dated June 26, 1888.

Application filed October 14, 1887. Serial No. 252,313. (No model.)

*To all whom it may concern:*

Be it known that I, WILLIAM B. TURNER, of Schenectady, in the county of Schenectady and State of New York, have invented a certain new and useful Improvement in Journal-Boxes, of which the following is a specification.

My invention relates to a simple and efficient construction for the bearings and supports of shafts, by means of which the oiling of such bearings is effectively accomplished.

The main feature of my invention consists in providing the interior of the journal-bearing with a number of spiral grooves or depressions which extend from each end of the bearing toward the middle, where they all terminate in a circumferential groove extending around the bearing, and from which groove an aperture extends through the sleeve, through which the oil will flow off. I prefer to employ this construction in connection with a reservoir in the pedestal below the bearing, into which the oil runs, and devices at the ends of the bearing to lift oil from such reservoir up to such ends, so that a circulation of the oil is obtained by the movement of the shaft.

In addition to these general features, my invention consists in other novel devices employed by me in accomplishing the above-named object, as hereinafter set forth and claimed.

In the accompanying drawings, Figure 1 is a longitudinal section of a pillow-block and journal-bearing embodying my invention, and Fig. 2 a central cross-section thereof.

A is the pedestal, and B the cap, of the pillow-block.

C C is the journal-bearing, shown as formed in two parts, though it may be a single sleeve.

At the middle of the bearing is formed an internal groove, $a$, extending around it, and on each side of this middle groove the bearing is formed with a number of spiral grooves, $b$, extending from each end toward the middle of the bearing and all communicating with the middle groove, $a$. These spiral grooves $b$, I fill with Babbitt or other soft metal, $c$, which, being softer than the metal of the sleeve, when the shaft is in place, is forced in or depressed in the grooves very slightly, but sufficiently, so that the grooves form shallow channels or depressions, in which the oil is worked from the ends along toward the middle of the bearing, and at the same time the bearing-surfaces are sufficiently lubricated.

Below the bearing the pedestal is formed into a chamber D, which is the oil-reservoir, and below this is formed a receptacle, E, communicating with the chambers D by the apertures $d$, which extend through the bearing-support F from the central aperture, $e$.

In the upper side of the bearing-sleeve, near each end, is formed a slot, $f$, and in each of these slots is hung a metal ring, $g$, which rings hang down into the oil-chambers D D.

The chambers D D are partly filled with oil, so that the rings $g$ hang down into the oil. As the shaft turns, these rings turn slowly by their friction, and continually carry up oil to the slots $f$. Such oil enters the bearing through these slots, and then the grooves $b\ b$ guide it along the journal to the middle of the bearing, where the oil from both ends enters the groove $a$. From the groove $a$ the oil flows down through the central aperture into the lower oil-chamber, E. The oil is thus kept in continual circulation, but the oil which comes from the shaft, and which may contain dirt and sediment, is returned to the bottom of the reservoir, and has time to settle and cool before it can be taken up to the bearing again.

The cap B is provided with holes, closed by bolts $h$ or otherwise, through which the interior may be inspected, or the reservoir may be filled with oil. I prefer also to provide an opening, $i$, extending to the bearing, on which an oil-cup can be placed; or oil can be otherwise introduced if it should ever be desired to lubricate the bearing in that manner, in which case, of course, the spiral grooves will be formed in the opposite direction from that shown.

If the shaft should bear so evenly upon the bearing that the soft metal is not depressed, the oil will still be carried in the interstices between such soft metal and the metal of the sleeve.

While I prefer to employ the filling of soft metal in the grooves, the bearing may be formed of one metal and grooves left empty therein; or, in a composite bearing of two or more metals, grooves may be made in each or in one of the different metals or along the junction of the different metals.

What I claim is—

1. A journal-bearing having an internal circumferential groove at its middle part, an opening through the bearing from said groove, and spiral grooves or depressions extending from each end to said middle groove, substantially as set forth.

2. A journal-bearing having an internal circumferential groove at its middle part, an opening through the bearing from said groove, and spiral grooves extending from each end to said middle groove, said spiral grooves being filled with soft metal and forming channels for conveying oil along the bearing, substantially as set forth.

3. A journal-bearing having internal spiral grooves or depressions extending from each end to the middle of the bearing, in combination with the lower oil-chamber beneath the bearing, a passage from the middle of the bearing to said oil-chamber, the upper communicating oil-chamber, and a lifting device at each end of the bearing for raising oil from said upper oil-chamber and delivering it to the bearing, substantially as set forth.

This specification signed and witnessed this 11th day of October, 1887.

WILLIAM B. TURNER.

Witnesses:
W. G. GILMORE,
EVERETT SMITH.